Nov. 24, 1959     F. K. H. NALLINGER     2,914,043
METHOD AND APPARATUS FOR OPERATING FUEL INJECTION ENGINES
Filed Dec. 14, 1955
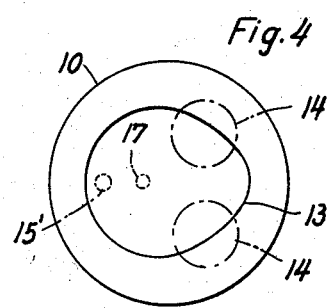
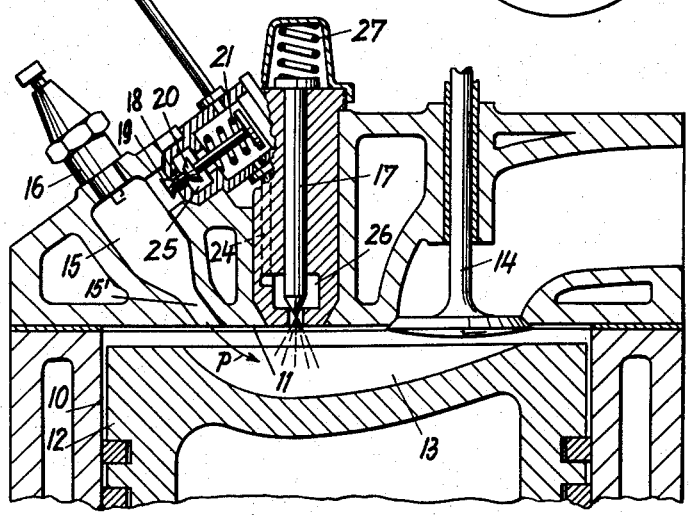
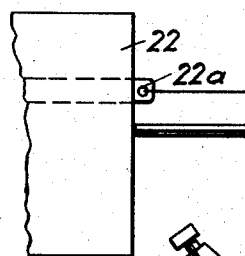
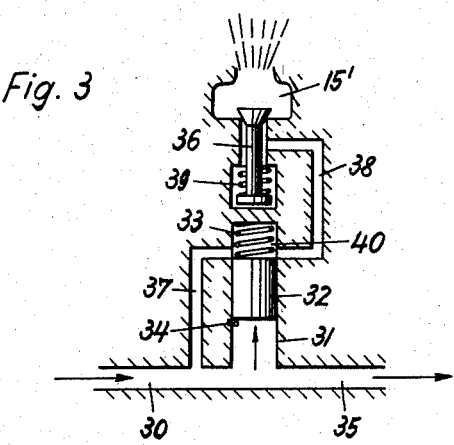
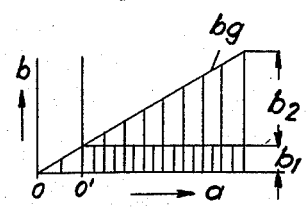
INVENTOR
FRIEDRICH K. H. NALLINGER
BY *Dicke and Craig*
ATTORNEYS.

United States Patent Office 2,914,043
Patented Nov. 24, 1959

2,914,043

METHOD AND APPARATUS FOR OPERATING FUEL INJECTION ENGINES

Friedrich K. H. Nallinger, Stuttgart, Germany, assignor to Daimler-Benz Aktiengesellschaft, Stuttgart-Unterturkheim, Germany Application December 14, 1955, Serial No. 553,051

Claims priority, application Germany December 16, 1954

13 Claims. (Cl. 123—32)

The present invention relates to a method and an apparatus for operating fuel injection engines, and especially gasoline injection engines, wherein the output of the engine will be regulated by varying the quantity of fuel injected therein.

While in diesel engines the fuel supply is generally controlled by supplying the engine with a constant charge of air and by adjusting the output of the engine solely by regulating the quantity of fuel supplied thereto, which means that the control depends upon the quality rather than the quantity of the fuel supply as in ordinary carburetor engines, such type of fuel control involves considerable difficulties in injection engines which are operated with gasoline or other light fuels.

In such an engine it will often, or even generally, be impossible to obtain a reliable ignition of the fuel by means of an ignition device such as a spark plug, and even by stratifying the mixture so as to produce a rich, easily ignitable mixture in the vicinity of the spark plug, while a poor or normal mixture will be present in those parts of the combustion chamber which are more remote from the spark plug, the results attained are not satisfactory under any operating conditions.

It is, therefore, one of the objects of the present invention to provide a new fuel supply method which insures a proper ignition under any operating conditions.

A further object of the invention is to provide a new fuel injection apparatus which attains the above-mentioned object by very simple, inexpensive, and reliable means.

Another object of the present invention is to provide a method of injecting a relatively small quantity of fuel into a precombustion chamber and igniting the same therein by suitable ignition means, and in injecting the remaining fuel quantity into the main combustion chamber and igniting the same therein by means of the burning fuel jet which is projected from the precombustion chamber into the main combustion chamber.

Another object of the invention is to provide a method of branching off from the total quantity of fuel which is to be injected during each compression stroke into the engine cylinder a substantially uniform portion which forms an easily combustible mixture, and injecting such portion into one part of the combustion chamber, for example, into a precombustion chamber, and igniting it therein by applied ignition, and adjusting only the remaining quantity of fuel and injecting such adjusted portion into another part of the combustion chamber, for example, the main combustion chamber, in which it is ignited by the flame of the first ignited fuel portion which thus acts like a pilot flame.

The present invention and its features of design and construction are based upon a recognition of the fact that even a very poor fuel mixture may be ignited if, rather than using a small spark for such purpose, the ignition is produced along a larger surface, for example, by a flame passing over such surface.

The features of the invention therefore consist in providing a precombustion chamber and means for injecting a uniform quantity of fuel into such chamber so that the fuel mixture therein will always have the same highly-inflammable composition which will be contained therein until ignited into a sharp jetlike flame, and in means for directing such flame toward the fuel mixture which may be contained, for example, in the main combustion chamber and which itself may be insufficiently enriched to be properly ignited by a normal spark ignition, for example, when the engine is operating only under a small load.

In order to attain an injection mechanism of relatively simple and inexpensive but very reliable construction, the present invention further provides an arrangement wherein both fuel quantities, i.e. that to be injected into the precombustion chamber and the other to be injected into the main combustion chamber, will be supplied by only one adjustable fuel pump and, preferably also through the same feed line leading from such pump to both injection nozzles.

Another object of the invention resides in providing a device which automatically controls the quantity of fuel which is branched off from the main feed line to the precombustion chamber so as to be substantially uniform at all times.

A feature of the invention for attaining such object consists in an injection nozzle which is provided with a double-seat or double-acting valve of special design so that at first one valve passage will be opened under the pressure of the fuel and, after the valve has carried out a certain stroke which, if desired, may be adjustable, the other valve passage will automatically be closed.

Still another feature of the invention consists in providing a special control member, for example, a slide valve, in the feed line leading to the injection valve for the precombustion chamber, and in subjecting such slide valve to the pressure in the feed line so that, after such slide valve has carried out a certain length of stroke, it will automatically and gradually shut off any further supply of fuel to the mentioned injection valve.

Further objects, features, and advantages of the present invention will appear from the following detailed description thereof, as well as from the accompanying diagrammatical drawings, wherein—

Fig. 1 shows one embodiment of the invention illustrating a fuel injection engine which is provided with an injection nozzle designed as a double-seat valve for producing a uniform fuel mixture;

Fig. 2 shows a control diagram of the fuel injection obtained according to the invention;

Fig. 3 shows a modification of the invention illustrating a special device which is inserted into the fuel line in front of a nozzle for regulating the fuel supply, and which produces a uniform fuel mixture; while Fig. 4 is a top view in reduced scale of the piston showing the contour of the combustion chamber of a fuel injection engine according to the present invention.

Referring to the drawings, Fig. 1 shows a cylinder 10 and a cylinder head 11, both of which may be cooled by water, air, or the like. A piston 12, the head of which has a depression of suitable shape to form the main combustion chamber 13, is capable of reciprocating in cylinder 10. The cylinder head 11 is provided with an intake valve and an exhaust valve, one of which is indicated at 14.

Cylinder head 11 is further provided with an antechamber or precombustion chamber 15 which is disposed eccentrically of the cylinder and contains a spark plug 16. At its end opposite to spark plug 16, precombustion chamber 15 extends into a gradually narrowing, nozzlelike channel 15' of relatively small cross section which terminates into main combustion chamber 13.

The fuel is injected into main combustion chamber 13 by two different means and in two different directions, namely, on the one hand, by an injection nozzle 17 which may be, for example, of customary design and terminates directly into main combustion chamber 13, and, on the other hand, by a nozzle 18 which terminates into precombustion chamber 15. Nozzle 18 consists of a double-seat valve having valve heads or poppets 19 and 20 which are designed so that poppet 19 is normally closed by means of a spring 21, while poppet 20 is held in the open position. The fuel is supplied to fuel chambers 25 and 26 of valves 18 and 17, respectively, through lines 23 and 24 by means of a pump 22, which may, for example, be provided with a control rod 22a. The poppet of injection valve 17 is normally held in the closed position by a spring 27.

If there is no fuel pressure in line 23, valves 18 and 17 will be in the closed position as shown in Fig. 1. If, however, fuel is forced by pump 22 through line 23, the pressure exerted in chambers 25 and 26 will act upon valves 18 and 17 and first open that valve which is acted upon the the smaller spring pressure.

If, therefore, spring 21 is made weaker than spring 27, valve 18 will open prior to valve 17 by lifting poppet 19 from its seat so that the fuel will be injected through the valve clearance into precombustion chamber 15 where a rather rich fuel mixture will thus be supplied to the vicinity of spark plug 16. However, the fuel quantity which may be injected into precombustion chamber 15 through the valve clearance of poppet 19 is limited since, after poppet 19 has reached a certain stroke, poppet 20 automatically closes the valve and shuts off the connection between fuel chamber 25 and precombustion chamber 15. In order to permit an accurate adjustment of valve 18 and thus of the fuel quantity which may be injected into chamber 15, it is advisable to design poppets 19 and 20 so as to be adjustable relative to each other, for example, by securing them to the valve shaft by means of set screws, or by providing the valve shaft with outer screw threads and poppets 19 and 20 with internal threads and screwing the poppets along the valve shaft to their proper position and by then securing them in such position. After valve 18 has thus again closed or closes simultaneously with the injection of fuel into chamber 15 if springs 21 and 27 are made of corresponding strength, valve 17 will also open so that the remainder of the fuel will be injected into the main combustion chamber 13.

After the compression stroke has been completed, valve 17 will again close under the action of spring 27, while valve 18 returns under the action of spring 21 to the position as shown in which poppet 19 blocks the fuel passage to precombustion chamber 15.

As illustrated in Fig. 1, precombustion chamber 15 and channel 15' are preferably disposed at an inclined angle to cylinder head 11, while main compression chamber 13 is preferably made of a curved spoon-shaped cross section with its deepest portion underneath nozzle 17 and gradually levelling off like a spoon toward the end nearest valve 14. The outlet of channel 15' into main combustion chamber 13 is disposed relatively close to the outlet of nozzle 17. By such position and shape of the mentioned elements, the jetlike flame produced by the combustion of the mixture of fuel and air in precombustion chamber 15 near the end of the compression stroke of piston 12 will be projected directly upon and into the fuel projected from nozzle 17 into main compression chamber 13, in the direction of the arrow p, that is, in a direction substantially parallel to the bottom of main compression chamber 13. Such passage of the strong jetlike flame issuing from channel 15' will assure a complete combustion of the fuel in main combustion chamber 13 under any operating conditions.

In the control diagram shown in Fig. 2, the fuel quantity $b$ is plotted against the control stroke $a$, while $b_g$ indicates the total quantity of fuel which is controlled by fuel pump 22 and supplied to cylinder 10 of the engine. Of this total fuel quantity, the same portion $b_1$ will always be injected into the precombustion chamber 15 by means of valve 18 which automatically controls the fuel quantity supplied, while the remainder $b_2$ will be injected directly into the main combustion chamber 13 through nozzle 17. While the quantity $b_1$ will always be substantially constant, especially above the idling point O', the remainder $b_2$ will be determined by whatever control may be provided on pump 22 or any other suitable point.

The fuel quantity which is injected directly into the main combustion chamber 13 may thus be quite small without danger that it might not ignite since the ignition of the fuel within precombustion chamber 15 insures that the flame which passes into the main combustion chamber 13 in the direction of the arrow p will also ignite the poor mixture in that chamber.

Fig. 3 shows a modification of the nozzle which terminates into the precombustion chamber and is provided with a special control mechanism for regulating the fuel quantity. For this purpose, the fuel passes from the pump through a line 30 to a branch 31 which forms a cylinder in which a valve plunger 32 is slidably mounted and normally held under the pressure of a spring 33 against a stop 34. While line 35 leads a part of the fuel through injection valve 17 directly into the main combustion chamber 13, another branch 37 first passes the main portion through a valve chamber 40 and a line 38 to a valve 36 which leads to the precombustion chamber 15'. The fuel passage through valve 40 may be shut off by plunger 32. A spring 39 tends to hold valve 36 in its closed position.

If during the injection period the fuel in feed line 30 is placed under pressure either by the injection pump itself or in any other manner, the fuel will first be conducted through lines 37 and 38 to valve 36 which will be opened by the fuel pressure against the action of spring 39. The fuel will thus at first be injected only into the precombustion chamber 15'.

At the same time, however, valve plunger 32 will be shifted in valve chamber 40 against the action of spring 33 so that after a certain stroke thereof, it will shut off the fuel supply to line 38 and valve 36 so that the latter will again close under the action of spring 39. The remainder of the fuel supplied by the fuel pump, the quantity of which may be regulated, will then pass through line 35 to the main injection valve 37 and then into the main combustion chamber 13. If desired, plunger 32 may also be provided with a retarding device for preventing valve 40 from being closed prematurely.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. An apparatus for operating a fuel injection engine comprising a main combustion chamber, a precombustion chamber separate from but communicating with said main combustion chamber, a first injection nozzle terminating into said main combustion chamber, a second injection nozzle terminating into said precombustion chamber, means for supplying fuel to both nozzles at each operating cycle of said engine including a single fuel injection pump and a single feed line for supplying fuel from said single pump to both of said injection nozzles, and means associated with said second nozzle for apportioning a set quantity of fuel and for supplying such set quantity to said second nozzle at each operating cycle of said engine.

2. An apparatus for operating a fuel injection engine comprising a main combustion chamber, a precombustion chamber separate from but communicating with said main combustion chamber, a first injection nozzle terminating into said main combustion chamber, a second injection nozzle terminating into said precombustion chamber, means for supplying fuel to both nozzles at each operating cycle of said engine, and means associated with said second nozzle for apportioning a set quantity of fuel and for supplying such set quantity to said second nozzle at each operating cycle of said engine, said apportioning means comprising a channel for conducting the fuel, a valve member for alternately opening and closing said channel, resilient means tending to maintain said valve member in the open position, and means associated with said valve member and adapted to be acted upon by the fuel pressure so that, after the injection of fuel into said precombustion chamber has started, said fuel pressure tends to move said valve member to the closed position against the action of said resilient means.

3. An apparatus for operating a fuel injection gasoline engine comprising a cylinder, a piston slidable therein, a precombustion chamber, a main combustion chamber disposed within said cylinder and formed in cross section by an eccentrically shaped recess in the top portion of said piston having a larger depth adjacent said precombustion chamber than on the opposite side thereof, a channel connecting said chambers, said channel terminating in said main combustion chamber in a substantially tangential direction to the curvature of said recess when said piston is in the approximate top dead center position thereof so that the combustion gas jet discharged from said channel is directed to the opposite side of said main combustion chamber by the curvature of said eccentrically shaped recess, a first injection nozzle terminating in said combustion chamber adjacent the narrow end of said channel so that the fuel jet projected from said first nozzle intersects the combustion gas jet which is discharged from said narrow channel and so that said fuel jet from said first injection nozzle and said combustion gas jet will impinge upon each other within said main combustion chamber adjacent said first nozzle and said narrow channel end, a second injection nozzle terminating into said precombustion chamber, and means for supplying gasoline fuel to both of said nozzles.

4. An apparatus as defined in claim 3, further comprising means associated with said second injection nozzle for apportioning a set quantity of fuel and for supplying such set quantity to and through said second nozzle at each operating cycle of said engine.

5. An apparatus as defined in claim 4, wherein said fuel supply means comprise a single fuel injection pump and a single feed line for supplying fuel under pressure to both of said injection nozzles, and means for adjusting the fuel quantity supplied by said pump into said feed line.

6. An apparatus for operating a fuel injection engine comprising a main combustion chamber, a precombustion chamber separate from but communicating with said main combustion chamber, a first injection nozzle terminating in said main combustion chamber, a second injection nozzle terminating in said precombustion chamber, means for supplying fuel to both nozzles at each operating cycle of said engine, and means associated with said second nozzle for apportioning a set quantity of fuel and for supplying such set quantity to said second nozzle at each operating cycle of said engine, said second nozzle including a channel for conducting the fuel, and said apportioning means including a double-seat valve mounted within said channel and resilient means for said valve, said valve having valve members adapted to open in opposite directions so that the passage through said channel will be closed by one valve if the pressure of the fuel is less than that exerted by said resilient means, and by the other valve member if the fuel pressure exceeds the pressure of said resilient means, so that the fuel will be capable of passing through said channel into said precombustion chamber only during the period of the movement of said double-seat valve from one closing position to the other closing position thereof.

7. An apparatus as defined in claim 2, further comprising a feed line connecting said fuel supply means with said second injection nozzle, said valve member being mounted within said feed line intermediate a first and second part thereof, said valve member comprising a slide member adapted to connect said first and second parts of said feed line in the opening position of said member and to disconnect said parts in the closing position thereof.

8. An apparatus as defined in claim 1, wherein both injection nozzles include a valve member adapted to be opened by the pressure in said single feed line, and resilient means tending to maintain said valves in the closed position, said resilient means having a strength relative to each other so that, when the pressure increases in said single feed line, the valve member in said second nozzle will open against the action of its resilient means prior to the time when the valve member in said first nozzle opens against the action of its resilient means.

9. An apparatus for operating a fuel injection engine comprising a main combustion chamber, a precombustion chamber separate from but communicating with said main combustion chamber, a first injection nozzle terminating into said main combustion chamber, a second injection nozzle terminating into said precombustion chamber, means for supplying fuel to both nozzles at each operating cycle of said engine, and means associated with said second nozzle for apportioning a set quantity of fuel and for supplying such set quantity to said second nozzle at each operating cycle of said engine, said apportioning means comprising a channel for conducting the fuel, a valve member for alternately opening and closing said channel including two valve seats, resilient means tending to maintain one of said valve seats in a closed position, and means associated with said valve member and adapted to be acted upon by the fuel pressure so that, after the injection of fuel into said precombustion chamber has started, said fuel pressure tends to move said other set of said valve member to the closed position against the action of said resilient means.

10. An apparatus as defined in claim 3, wherein said precombustion chamber as well as said cylinder containing said main combustion chamber is surrounded by jackets containing liquid coolant.

11. A fuel nozzle for an internal combustion engine comprising a main combustion chamber, a precombustion chamber separate from but communicating with said main combustion chamber, a first injection nozzle terminating into said main combustion chamber, a second injection nozzle terminating into said precombustion chamber, means for supplying fuel to both nozzles at each operating cycle of said engine, and means associated with said second nozzle for apportioning a set quantity of fuel and for supplying such set quantity to said second nozzle at each operating cycle of said engine, said second nozzle comprising a channel for conducting the fuel, and said apportioning means comprising a double-seat valve mounted within said channel, and valve having valve members adapted to open in opposite directions so that the passage through said channel will be closed by one valve if the pressure of the fuel is less than that exerted by said resilient means, and by the other valve member if the fuel pressure exceeds the pressure of said resilient means, so that the fuel will be capable of passing through said channel into said precombustion chamber only during the period of the movement of said double-seat valve from one closing position to the other closing position.

12. An apparatus for operating a fuel injection engine comprising a cylinder, a piston slidable therein, a main combustion chamber, a precombustion chamber, a channel connecting said main combustion chamber with said precombustion chamber, means including a first injection nozzle for first injecting a fuel portion into said precombustion chamber and igniting the same therein so that the ignited fuel will be blown by the pressure of combustion in the precombustion chamber into the main combustion chamber, means including a second injection nozzle for injecting another fuel portion into the main combustion chamber after said first portion has been injected into the precombustion chamber so as to be ignited in said main combustion chamber by the ignited fuel from the precombustion chamber, and means for supplying fuel to both of said nozzles.

13. An apparatus according to claim 12, wherein said main combustion chamber is located within said cylinder and is formed in cross section by a concave recess in the top portion of said piston having a larger depth adjacent said precombustion chamber than on the opposite side thereof, and wherein said channel terminates in said main combustion chamber in a substantially tangential direction to the curvature of said recess when said piston is in its approximate top dead center position.

References Cited in the file of this patent

UNITED STATES PATENTS

| | | |
|---|---|---|
| 1,235,725 | Power | Aug. 7, 1917 |
| 1,406,877 | Lemaire | Feb. 14, 1922 |
| 1,616,157 | Werner | Feb. 1, 1927 |
| 2,463,418 | Pateras-Pescara | Mar. 1, 1949 |

FOREIGN PATENTS

| | | |
|---|---|---|
| 317,279 | Great Britain | Aug. 15, 1929 |
| 375,461 | Great Britain | June 30, 1932 |
| 899,431 | France | Nov. 5, 1943 |